Jan. 22, 1952 B. B. BAUER 2,583,289

PHONOGRAPH STYLUS

Original Filed Aug. 30, 1947

INVENTOR.

Benjamin B. Bauer

BY

Thiess, Olson & Mecklenburger.

Att'ys

Patented Jan. 22, 1952

2,583,289

UNITED STATES PATENT OFFICE 2,583,289

PHONOGRAPH STYLUS

Benjamin B. Bauer, Oak Park, Ill., assignor to Shure Brothers, Incorporated, Chicago, Ill., a corporation of Illinois Original application August 30, 1947, Serial No. 771,433. Divided and this application April 30, 1949, Serial No. 90,688

1 Claim. (Cl. 274—38)

This application is a division of the application of Benjamin B. Bauer, Serial No. 771,433, filed August 30, 1947, for Phonograph Apparatus, and the invention hereof relates to a stylus for reproducing sound from records, it being an object of the invention to provide an improved stylus of this character.

Phonograph translating devices for reproducing sound from records, termed pickups, frequently are in the form of cartridges which comprise a casing having a translating element and a coupling structure therein. Terminals in the form of prongs connected to the translating element extend from one end of the casing for easy and rapid insertion into corresponding sockets in the phonograph tone arm. A record engaging needle or stylus is arranged exteriorly of the casing adjacent the other end for following record grooves, the stylus being attachable to the coupling structure by means of a screw, for example, usually also projecting from the casing where it is engageable by hand or with a tool. The coupling serves to transmit mechanical movements or some function thereof from the stylus to the translating element, and the translating element serves to convert the transmitted mechanical movements into electrical variations which are transmitted through the cartridge terminals to the phonograph amplifier or other reproducing device. For high quality reproduction, the sound output from the phonograph should be substantially free from extraneous noises such as needle and record talk, and needle hiss, the former being sounds radiated directly to the atmosphere because of the vibrations of the stylus, the coupling structure, and the record itself, and the latter being sounds caused by surface imperfections of the record and may pass through the pickup and phonograph.

The width of the groove in phonograph records varies, and when the width decreases, a component of force upward is produced on the stylus and the pickup in general. This effect may cause fluctuations of the stylus in the groove which is undesirable in high quality reproduction, and it is a further object of the invention to provide an improved stylus having vertical compliance or resilience whereby extraneous noises due to such effects are substantially prevented from reaching the translating element.

In pickups of the character described, a torsion member is arranged internally of the casing for actuating the translating element, such for example as a crystal, and an arm or stud, which extends through the casing substantially at right angles thereto, is relatively permanently attached to the torsion member. The stud has a hole at its lower end into which one end of the stylus is relatively easily receivable.

It is a further object of the invention to provide an improved stylus whereby the stylus may be easily and accurately aligned in proper playing position in the stud.

In carrying out the invention in one form, a laterally rigid and vertically resilient record engaging stylus is provided comprising an attaching portion, an offset portion extending at an angle to the attaching portion, and a curved member extending from the offset portion and terminating in a record engaging point. The attaching portion, the offset portion, and the curved member each have a ratio of transverse dimension to vertical dimension substantially greater than unity.

For a more complete understanding of the invention, reference should be had to the accompanying drawing in which.

Figure 1:
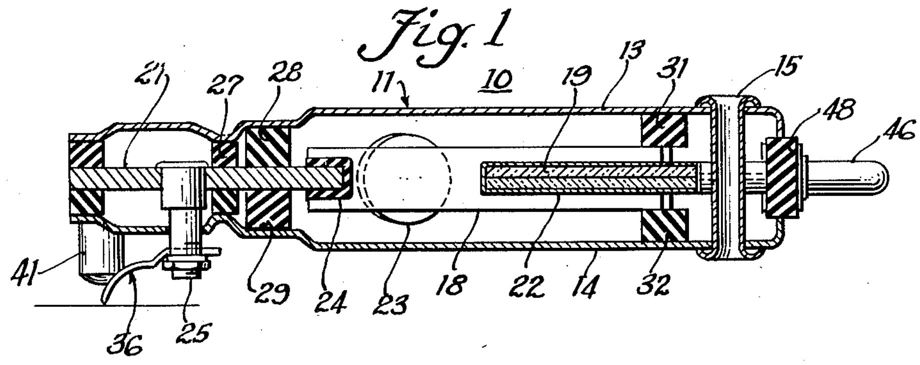
Figure 1 is a sectional view of a phonograph pickup including a stylus embodying the invention.
Figure 2:
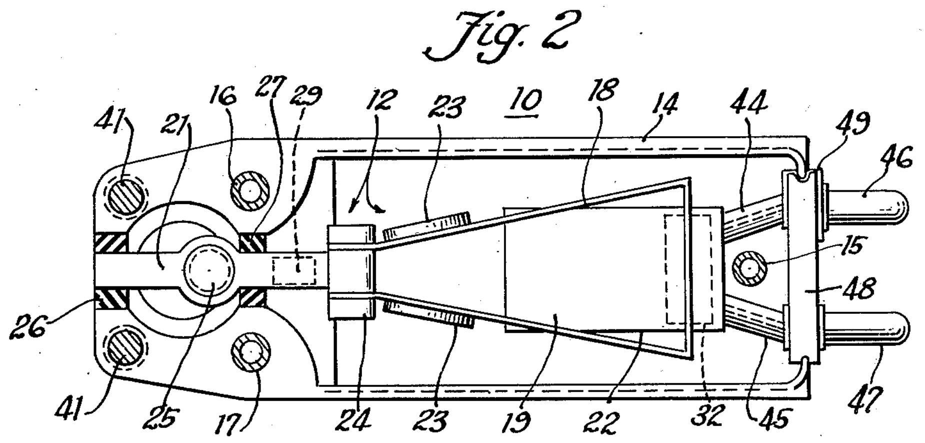
Fig. 2 is a top plan view of the pickup shown in Fig. 1 with the top cover removed.

Referring more particular to the drawing, the invention is shown embodied in the stylus 36 of a phonograph pickup 10, the pickup comprising a casing 11 and a translating assembly 12 inside thereof. Casing 11 comprises couplementary top and bottom members 13 and 14 respectively, these members being formed by any well known process, such for example as by stamping or casting, and may be made of any material, such for example as brass, aluminum or plastic. As shown, casing members 13 and 14 are substantially identical with each other, are rectangular in outline, and when placed together form essentially a forward compartment and a rearward compartment which contain different portions of the translating assembly 12, holes being provided through the casing members whereby rivets 15, 16 and 17 may be inserted for holding the pickup in assembled relation.

Translating assembly 12 comprises a frame 18, a piezoelectric element 19, such as a Rochelle salt crystal, and a coupling structure including torsion member 21 connected to frame 18. The frame 18 is generally trapezoidal in outline, may be formed from a flat piece of material bent into the configuration shown, and is provided with three openings, these being respectively at the rear of the frame and along each side. Crystal 19, which may be sealed from the atmosphere by a protective coating 22, is held within the openings in frame 18 by any well known means, such for example as cement, the two side members of frame 18 being movable relative to each other whereby to distort the crystal and consequently produce an electrical output. Welded to the front ends of the frame members are a pair of weights 23 for predetermining desirable vibration characteristics of the frame and the cooperating structure.

While the active element of the translating assembly 12 has been shown as a piezoelectric element 19, it will be understood that this is exemplary only and that other suitable transducing elements, such for example as magnetic units, condenser units or photoelectric units, may be used.

The torsion member 21 is a relatively stiff member and is T-shaped in outline, the T end thereof being received between prongs on the front ends of the side members of frame 18. A rubber spacer 24 is placed between the end of torsion member 21 and the prongs whereby the coupling between frame 18 and torsion member 21 is resilient. Hence, the movements of torsion member 21 are transmitted to frame 18 and crystal 19 with decreased amplitude, relatively speaking. This is done because of the fact that the crystal may be very stiff and distortions of relatively smaller amplitude may be desirable.

The mechanism for transmitting motion to the piezoelectric element 19, including the frame 18, is described fully and claimed in Bauer United States Patent 2,513,269.

In the forward compartment of casing 11, a downwardly projecting stud 25 is rigidly attached to torsion member 21 to form part of the coupling mechanism. As shown, the stud is attached to the torsion member by riveting over, but this is by way of example only since other well known means may be used. The stud is made of some light metal, for example aluminum, in order that the inertia of the coupling mechanism may be kept at a minimum. It projects through an opening provided in the bottom member 14 of the casing.

A pair of resilient rubber bearing members 26 and 27 support torsion member 21 within the casing 11, the bearing members being held within the forward portion of the casing by journals formed by indenting the casing material as shown. Due to the rubber bearings or washers, the torsioin member may have slight movements both vertical as well as horizontal, and its rotational movements are resiliently resisted, this being enhanced by the fact that torsion member 21 may be rectangular in cross section and therefore have a firm grip within the rubber bearings.

Forwardly of the rearward chamber there is a pair of damping members 28 and 29 lying one on each side of the torsion member and bearing against the inside of the housing members 13 and 14. Damping members 28 and 29 may be formed of substances known as elastomers, which substances have some resilience as well as the ability to absorb energy and thus supply some restoring force to torsion member 21 in addition to damping undesirable resonances thereof. At the rear of frame 18 there is a pair of support members or pads 31 and 32 formed of resilient substances such as elastomers whereby to resiliently support frame 18 and at the same time provide damping for undesirable resonances. The members 28, 29, 31 and 32 may, for example, be made of Du Pont Pyralin, Type X-24.50.

Figures 3, 4, 5:
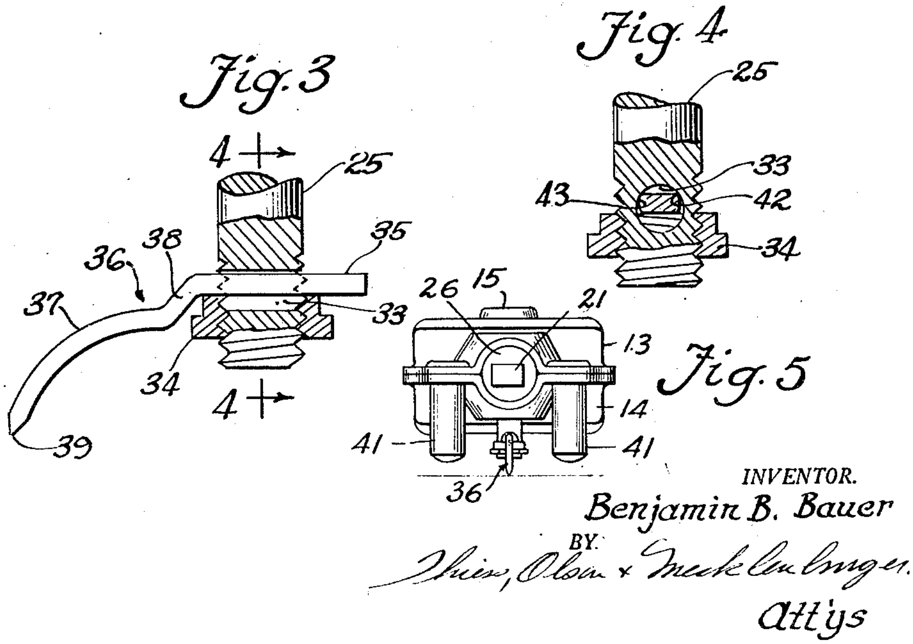
Fig. 3 is a fragmentary view of Fig. 1 on a larger scale, partially in section and partially broken away.
Fig. 4 is a view, partially in section and partially broken away, taken substantially in the direction of arrows 4—4 of Fig. 3.
Fig. 5 is an end elevational view looking at the structure of Figs. 1 and 2 from the left.

Referring to Figs. 3 and 4, the stud 25 is provided with a hole 33 adjacent its lower end, which end is threaded to receive a nut 34. Nut 34 may be slotted or hexagonal, for example, for tightening with a wrench or it may be knurled, for example, for tightening with the fingers. Extending through hole 33 is the shank 35 of the record engaging stylus or needle 36.

The stylus 36 includes a curved portion 37 extending from shank 35 through an offset portion 38 which extends downwardly at an acute angle to the shank, the curved portion terminating in a record engaging point 39. The stylus cross section is generally uniform and is substantially rectangular with a horizontal dimension considerably greater than the vertical dimension so that the stylus is vertically resilient and laterally stiff. As shown in the drawings, the ratio of the horizontal dimension to the vertical dimension is approximately 2. The curved portion 37 renders the stylus even more rigid laterally so that lateral movements of the point 39, when following a record groove, are transmitted virtually directly to the stud 25 without lateral distortion or bending of the stylus along its length. The stylus may be formed of any suitable material, such for example as carbon steel, and may be formed by stamping from a round wire. The point 39 may be of hardened steel forming a direct part of the stylus material or it may be a hard point such as sapphire or diamond attached to the stylus.

When vertical forces are exerted downwardly on stud 25 and stylus 36, the curved portion 37 thereof bends somewhat along its length, but the major portion of the deflection or bending takes place adjacent the offsetting portion 38. Small vertical movements, such as due to the pinch effect already referred to, are taken account of by the vertical resilience of the stylus. When, however, substantially larger forces are exerted on the point 39, these occurring for instance when the tone arm is dropped onto the record, it is desirable that deflections of the stylus beyond a predetermined amount be prevented in order not to exceed the elastic limit of the stylus as well as to prevent injury to the point. This is accomplished by the provision of tusks 41 on each side of point 39 and terminating a short distance there above, the tusks being rigidly attached to the casing 11. When the stylus deflects due to large forces exerted thereon, the lower ends of the tusks come into contact with the record surface and thereby prevent deflection of the stylus beyond a predetermined amount.

In order to be able to align stylus 36 properly without the need of exercising unusual skill, the construction of the lower end of stud 25, nut 34, and shank 35 are such that the shank 35 may be inserted within hole 33 and the nut 34 tightened with the assurance that the stylus will be in the optimum position. According to the invention, this is accomplished in one manner by forming hole 33, such as by drilling, with its axis parallel to the axis of torsion member 21. The shank 35, being relatively rectangular in cross section, has two upper edges 42 and 43 which engage the surface of hole 33 along lines which also are parallel to the axis of the torsion member. The underside of shank 35 is flat and the upper surface of nut 34 is flat. Moreover, the axis of stud 25 and that of nut 34 is at right angles to the axis of torsion member 21. The upper surface of nut 34, in addition to being flat, is also at right angles to the axis of stud 25. Accordingly, when nut 34 is tightened against the flat undersurface of shank 35, the upper edges 42 and 43 thereof are forced against the upper surface of hole 33. Since the axis of hole 33 is parallel to the axis of torsion member 21, the shank 35 of the stylus is held parallel to the axis of the torsion member, and since the coacting surfaces of nut 34 and shank 35 are flat, the stylus is held to lie substantially in a vertical plane containing the axis of the torsion member, and consequently the point 39 is maintained in the proper position for engaging the record surface.

The axis of stud 25 being at right angles to that of the torsion member, tightening the nut 34 to hold the stylus tends to produce only lateral forces upon the end of torsion member 21 connected to frame 18, and not rotational forces exerted about its axis. Distortions of frame 18 are thus lacking when nut 34 is being tightened, and consequently no distortions of crystal 19 occur. Hence there is no disagreeable noise produced in an operating phonograph when the stylus is being changed and there is no danger of applying damaging forces to the crystal.

The offset portion 38, in addition to providing desired vertical resilience for the stylus, by coming up against nut 34 prevents shank 35 from being pushed through hole 33 beyond the optimum point. Hence, the position of the needle in hole 33, both as to its position lengthwise of the pickup and its proper position for playing a record, is automatically taken account of.

When the pickup is in use, the point 39 of the stylus engages the groove of the record and the lateral undulations thereof are transmitted by means of the stylus and stud to torsion member 21. Rotations of the torsion member effect distortions of frame 18 and consequent distortions of crystal 19 to produce output as already described.

The stylus 36 is a small light member, its transverse dimension for example being of the order of .03 inches, and the weight of stud 25 may be made small through the use of light weight material. Thus, the rotational moment of inertia introduced by the stud 25 and stylus 36 may be kept small. The maximum transverse dimensions of the torsion member 21 also being made small, the rotational moment of inertia introduced by this portion of the coupling system is also small. Accordingly, the total moment of inertia may be kept relatively small and transverse movements of the point 39 are transmitted relatively faithfully to crystal 19. Large amplitudes of vibration at natural frequencies caused by the resilience of stylus 36 and the mass of stud 25 and torsion member 21 are largely damped out through the use of the damping members 28 and 29.

The output of crystal 19 is carried by means of conductors inside of shields 44 and 45 to prongs 46 and 47 for conduction to the phonograph amplifier, the prongs being supported in an insulating member 48 forming a closure for the rear end of casing 11. Prong 46 is grounded to casing 11 by the conducting strip 49.

The invention having thus been described, what is claimed and desired to be secured by Letters Patent is:

A stylus for engaging a record groove having lateral undulations, comprising a shank portion, a downwardly curved point-carrying portion extending generally obliquely with respect to the shank portion, said shank portion being substantially flat in a plane lying transverse to the direction in which said point-carrying portion extends, said stylus being relatively thin in a vertical direction and being relatively wide and of substantially uniform width in a horizontal direction, an intermediate offset portion between and connecting said shank portion and said point-carrying portion and also oblique to said shank portion, said point-carrying portion being curved in the direction of its length and with its convex surface facing away from the record, and a point at the end of said point-carrying portion and forming substantially a continuation of said curve.

BENJAMIN B. BAUER.

REFERENCES CITED

The following references are of record in the file of this patent:

UNITED STATES PATENTS

| Number | Name | Date |
|---|---|---|
| 1,290,295 | Muller | Jan. 7, 1919 |
| 2,320,416 | Dally | June 1, 1943 |
| 2,328,889 | Capps | Sept. 7, 1943 |
| 2,476,414 | Hutter | July 19, 1949 |
| 2,480,907 | Dally | Sept. 6, 1949 |
| 2,509,356 | Kilgour | May 30, 1950 |